United States Patent Office 3,275,713
Patented Sept. 27, 1966

3,275,713
POLYMERIZABLE PLASTISOLS OF VINYL CHLORIDE POLYMERS AND MONOCHLOROSTYRENES
Louis C. Rubens and Demetrius Urchick, Midland, Mich., assignors to The Dow Chemical Company, Midland, Mich., a corporation of Delaware
No Drawing. Filed July 16, 1962, Ser. No. 210,205
21 Claims. (Cl. 260—884)

This invention relates to fluidized vinyl chloride polymer compositions and to a method for making fabricated products therefrom. More specifically, the invention relates to vinyl chloride polymer compositions that are fluidized with monochlorostyrenes.

For many purposes there is an advantage to prepare fabricated products, including rigid fabricated products of vinyl chloride products. Among other attributes of such polymers, they are exceptionally well suited where non-burnable requirements are called for. However, due to the sensitive nature of the polymers to heat, serious problems have been encountered in fabricating articles or products from these polymers. When temperatures are employed that are necessary to fluidize the polymer sufficiently to be extruded or fabricated, the polymer tends to thermally degrade.

One method employed to overcome the attendant problems in fabricating vinyl chloride polymers is to thermally fuse dispersions of the polymer in a plasticizer, thus requiring lower temperatures for sufficient fluidity. These polymer dispersions are frequently called plastisols in the art.

It is particularly advantageous if the plastticizer is a polymerizable monomer which can polymerize during the fusion step to enhance the physical properties of the fabricated product, for example, the elastic modulus. The choice of the particular monomer for this purpose, however, poses a special problem depending upon the properties both for the dispersion and the product. For instance, a monomer that may serve as a good plasticizer may actually detract from or downgrade the properties and characteristics of the final product. In this respect, both extremes may be experienced, e.g., a brittle, low elongation product may result, or a highly flexible product unsuitable for a rigid product may result. Or, the opposite may result, a monomer that provides good improvements in the vinyl chloride polymer when polymerized therein may be a poor plasticizer, and it may be necessary to use it in such great proportions that a removal problem of the excess monomer is incurred. Yet other problems in regard to the choice of monomer is that the monomer may be too unreactive, or in other words, too slow to polymerize to be of practical value.

Another significant drawback of many plasticizers is that the dispersions formed therewith have poor viscosity stability. That is, the viscosity of the dispersion increases with time. When this happens, it is necessary to extrude or fabricate the dispersion or plastisol as soon as possible after it is made. Otherwise the plastisol may become useless and have to be discarded. Unfortunately, many of the more desirable polymerizable plasticizer monomers as regards improving the physical properties of the fabricated vinyl chloride products do not produce viscosity stable dispersions with vinyl chloride polymers. Notably, some of these are styrene and vinyl toluene.

This phenomonon of the increasing viscosity of the plastisol with time is believed to be a result of the plasticizer actually penetrating the small particles of polymer. When this happens the ratio of solid to dispersing phase generates an increase in viscosity, which, if it continues can pass through the phases of gel or paste formation and in some cases it proceeds to a solid cake. Such viscous non-flowable forms are obviously not adaptable to the conventional handling techniques employed in fabricating polymers into shaped articles and the like.

Accordingly, it is the primary concern and chief object of this invention to provide viscosity-stable dispersions of vinyl chloride polymers that can be effectively and efficiently processed with conventional fabricating techniques into shaped products.

It is a further object to provide viscosity-stable dispersions of vinyl chloride polymers wherein the plasticizer used to form such dispersion will polymerize rapidly concurrently with or subsequent to fabrication of the dispersion into shaped products.

It is a still further object to provide viscosity-stable dispersions of vinyl chloride polymers that can be fabricated into rigid, high strength products.

A yet further object is to provide rigid, high strength shaped products from the viscosity-stable dispersions of vinyl chloride polymers of the invention.

An additional object of the invention is to provide a method for producing rigid, high strength shaped products from the viscosity-stable vinyl chloride dispersions of the invention.

In accordance with the present invention, viscosity-stable dispersions of vinyl chloride polymers that can readily and efficiently be processed into rigid high strength shaped or molded products with conventional fabricating techniques are provided by a composition comprising, in intimate mixture, from about 35 to about 70 weight percent, based on the weight of the composition, of a vinyl chloride polymer having at least about 85 weight percent polymerized vinyl chloride in the polymer molecule, with from about 65 to about 30 weight percent, based on the weight of the composition, of a monochlorostyrene.

Further and corollary accomplishments of the invention includes the preparation of shaped and molded products of the vinyl chloride polymer dispersions by a method comprising intimately mixing with a vinyl chloride polymer a sufficient amount of monochlorostyrene to suitably fluidize the vinyl chloride polymer; fabricating the dispersion into a shaped article or product; and, simultaneously with the fabricating and/or subsequent thereto, curing the dispersion to a rigid solid form.

Surprising as it may seem, the use of monochlorostyrene for the formation of vinyl chloride polymers plastisols provides uniquely superior and entirely unpredictable results. This is particularly evidenced when contrast is made between the related plasticizing monomers of, for example, styrene and dichlorostyrenes. The advantages and further objects of the invention, in this respect, will be manifest in the ensuing description and specification, and in the following examples wherein all parts and percentages are by weight unless otherwise specified.

EXAMPLE 1

*Comparison of the viscosity stability of polyvinyl chloride vinyl aromatic monomer dispersions*

(a) 50 grams of PVC grade plastisol resin (powder form) were stirred into 50 grams of styrene monomer for 1 minute at room temperature. A weak gel formed immediately. After 5 minutes at room temperature the mixture had the consistency of grease and after 25 minutes was a rigid cake. This composition could not be readily fabricated by conventional plastisol methods.

(b) 50 grams of the same PVC resin and 50 grams vinyl toluene mixed in the manner described in part (a) formed a thin opalescent fluid which became a weak gel in 6 minutes. After 9 minutes the consistency was that of a light grease. After 95 minutes at room temperature the mixture was a very heavy grease.

(c) 50 grams of the same PVC resin and 50 grams of dichlorostyrene (ring Cl) mixed as above formed an opaque thin fluid mixture. After 9 minutes this material exhibited slight thixotropy. Between 35 and 95 minutes the viscosity increased to a stiff fluid which would not flow off a vertical surface. This consistency persisted for at least 26 hours.

(d) 50 grams of the same PVC resin and 50 grams orthochlorostyrene were mixed in accordance with part (a) which formed a thin fluid mixture of creamy consistency which retained its fluidity for at least 26 hours at room temperature.

A comparison on an equivalent volume basis of PVC to monomer reveals a greater contrast between the monochlorostyrene and other vinyl aromatics.

(e) 44.47 cc. of the PVC mixed with 56.33 cc. styrene formed a weak gel immediately. After 5 minutes this mixture was a grease and after 15 minutes a semi-solid.

(f) 44.47 cc. PVC mixed with 56.33 cc. vinyl toluene formed a thin fluid which became like vaseline in 10 minutes. After 15 minutes this material assumed the properties of a heavy grease.

(g) 44.47 cc. PVC mixed with 56.33 cc. dichlorostyrene formed an opaque thin fluid. This mixture was readily pourable for at least 2–3 hours. After 19 hours it was a stiff gel which did not flow.

(h) 44.47 cc. PVC mixed with 56.33 cc. orthochlorostyrene formed a thin creamy fluid which poured readily and flowed easily on a level surface. These characteristics were retained for at least 3 hours. After 19 hours the mixture was still fluid enough to flow on a vertical surface.

EXAMPLE 2

Plastisols of PVC and orthochlorostyrene in which were incorporated a small amount of dicumyl peroxide to effect a cure of the plastisol (polymerization of the orthochlorostyrene) were spread into thin sheets between two platens. The platens were maintained at 160° C. and the plastisol composition was allowed to remain between the platens for various times after which they were removed and given a cold water chill. Solid sheets 0.065 in. were formed. The sheets were then subjected to physical testing and were observed for general appearance. These results are presented in Table I.

The bending modulus and flexural strength of the samples was determined with an Instron machine as follows. Samples of the sheets (0.5 in. x 3.0 in. x 0.0625 in.) were supported 2 inches apart and centrally loaded. A deflection rate of 0.12 in./min. was employed for the modulus determination and 1.2 in./min. for flex strength.

Bending modulus was calculated from Equation 1.

Equation 1:

$$E_B = \frac{w}{y} \frac{l^3}{4bd^3}$$

$E_B$ = bending modulus (p.s.i.)
$w$ = load (p.s.i.)
$y$ = deflection (inches)
$l$ = span length (inches)
$b$ = width (inches)
$d$ = thickness (inches)

Flexural strength was obtained from Equation 2.

Equation 2:

$$F.S. = \frac{3}{2} \frac{P^1}{bd^2}$$

$F.S.$ = flex strength (p.s.i.)
$P$ = breaking load (p.s.i.)

If no break occurred, the maximum of the load vs. deformation curve was taken as P.

The Barcol hardness is a simple penetrometer test which permits estimation of 95 percent or more cure. A Barcol hardness number of 80 indicates a cure of at least 95 percent.

TABLE I

| Sample No. | Composition | | | Curing Conditions, Time (Minutes) at 160° C. | Properties of the Cured Sheet | | | | |
|---|---|---|---|---|---|---|---|---|---|
| | PVC (wt. percent) | Ortho Chlorostyrene (wt. percent) | Dicumyl Peroxide (percent) | | Hardness (Barcol) | Flexural Strength (p.s.i.) | Bend Modulus (p.s.i.×10⁵) | Appearance | Color |
| A1 | 50 | 49 | 1 | 1 | Soft | | | Transparent | |
| A2 | 50 | 49 | 1 | 2 | 78 | 9,000 | 4.7 | Opaque | White. |
| A3 | 50 | 49 | 1 | 3 | 78 | 8,300 | 4.7 | do | Do. |
| A4 | 50 | 49 | 1 | 4 | 80 | 8,900 | 4.6 | do | Do. |
| A5 | 50 | 49 | 1 | 5 | 80 | 8,800 | 4.4 | do | Do. |
| A6 | 50 | 49 | 1 | 6 | 80 | 8,800 | 4.5 | do | Do. |
| B1 | 55 | 44.1 | .9 | 1 | Soft | | | Transparent | |
| B2 | 55 | 44.1 | .9 | 2 | 80 | 11,700 | 5.0 | Opaque | Do. |
| B3 | 55 | 44.1 | .9 | 3 | 82 | 10,800 | 4.8 | do | Do. |
| B4 | 55 | 44.1 | .9 | 4 | 82 | 11,000 | 4.7 | do | Do. |
| B5 | 55 | 44.1 | .9 | 5 | 82 | | | do | Do. |
| B6 | 55 | 44.1 | .9 | 6 | 82 | 11,100 | 5.2 | do | Do. |
| C1 | 60 | 39.2 | .8 | 1 | Soft | | | Transparent | |
| C2 | 60 | 39.2 | .8 | 2 | 80 | 13,300 | 4.8 | Opaque | Do. |
| C3 | 60 | 39.2 | .8 | 3 | 80 | | 5.8 | do | Do. |
| C4 | 60 | 39.2 | .8 | 4 | 80 | 11,800 | 4.8 | do | Do. |
| C5 | 60 | 39.2 | .8 | 5 | 80 | 10,000 | 5.4 | do | Do. |
| C6 | 60 | 39.2 | .8 | 6 | 80 | 13,000 | | do | Do. |
| D1 | 65 | 34.3 | .7 | 1 | Soft | | | Transparent | |
| D2 | 65 | 34.3 | .7 | 2 | 78 | 14,400 | 5.3 | Opaque | Do. |
| D3 | 65 | 34.3 | .7 | 3 | 80 | 14,500 | 5.1 | do | Do. |
| D4 | 65 | 34.3 | .7 | 4 | 81 | 12,500 | 4.6 | do | Do. |
| D5 | 65 | 34.3 | .7 | 5 | 81 | 15,100 | 4.6 | do | Do. |
| D6 | 65 | 34.3 | .7 | 6 | 82 | 13,600 | 4.7 | do | Do. |

Example 3

When the procedure of Example 2 was repeated excepting to employ styrene in place of the orthochlorostyrene for one series of plastisol samples and vinyl toluene in the place of the orthochlorostyrene for another series of plastisol samples, 20 to 30 minutes were required in order to transform the plastisol composition into a solid sheet.

Example 4

Plastisols were prepared following the same general procedure of Example 2 excepting to add small amounts of ethylene dimethacrylate (EDMA) with the orthochlorostyrene (OCS), and to add small amounts of dibutyl tin dilaurate (DBTL) as a heat stabilizer. Sheets were formed between the platens at 150° C. or 140° C. The results are presented in Table II. As evidenced by the results in Table II, it is seen that the addition of relatively small quantities of the EDMA facilitates the preparation of excellent clear, unclouded products.

was poured full of the fluid plastisol at room temperature. The flask was then immersed for 10 seconds in an oil

TABLE II

| Sample No. | Composition | | | | | Curing Conditions | | Properties of the Cured Sheet | | | |
|---|---|---|---|---|---|---|---|---|---|---|---|
| | PVC (wt. percent) | OCS (wt. percent) | EDMA (wt. percent) | Dicumyl Peroxide (wt. percent) | DBTL (wt. percent) | Time (min.) | Temp., °C. | Hardness (Barcol) | Flexural Strength (p.s.i.) | Bend Modulus (p.s.i.×10⁵) | Appearance-Color |
| E1 | 64.67 | 32.18 | 1.95 | 0.7 | 0.5 | 1 | 150 | 80 | 9,400 | 3.6 | Clear bluish cast. |
| E2 | 64.67 | 32.18 | 1.95 | 0.7 | 0.5 | 2 | 150 | 82 | 12,000 | 4.9 | Do. |
| E3 | 64.67 | 32.18 | 1.95 | 0.7 | 0.5 | 3 | 150 | 82 | 10,000 | 4.7 | Clear yellow cast. |
| E4 | 64.67 | 32.18 | 1.95 | 0.7 | 0.5 | 4 | 150 | 82 | 12,000 | 4.6 | Do. |
| E5 | 64.67 | 32.18 | 1.95 | 0.7 | 0.5 | 5 | 150 | 82 | 12,600 | 4.6 | Clear yellow. |
| E6 | 64.67 | 32.18 | 1.95 | 0.7 | 0.5 | 6 | 150 | 82 | 13,000 | 4.6 | Do. |
| F1 | 64.67 | 33.15 | 0.98 | 0.8 | 0.5 | 1 | 150 | 78 | 13,400 | 4.1 | Clear bluish tint. |
| F2 | 64.67 | 33.15 | 0.98 | 0.8 | 0.5 | 2 | 150 | 80 | 12,600 | 4.8 | Do. |
| F3 | 64.67 | 33.15 | 0.98 | 0.8 | 0.5 | 3 | 150 | 80 | 11,400 | 4.4 | Clear yellow tint. |
| F4 | 64.67 | 33.15 | 0.98 | 0.8 | 0.5 | 4 | 150 | 80 | 13,700 | 4.4 | Do. |
| F5 | 64.67 | 33.15 | 0.98 | 0.8 | 0.5 | 5 | 150 | 80 | 14,300 | 4.8 | Do. |
| F6 | 64.67 | 33.15 | 0.98 | 0.8 | 0.5 | 6 | 150 | 80 | 13,200 | 4.5 | Do. |
| G1 | 59.7 | 37.05 | 1.95 | 0.8 | 0.5 | 1 | 140 | 65 | | | Sl. hazy colorless. |
| G2 | 59.7 | 37.05 | 1.95 | 0.8 | 0.5 | 2 | 140 | 81 | | | Do. |
| G3 | 59.7 | 37.05 | 1.95 | 0.8 | 0.5 | 3 | 140 | 81 | | | Do. |
| G4 | 59.7 | 37.05 | 1.95 | 0.8 | 0.5 | 4 | 140 | 81 | | | Do. |
| G5 | 59.7 | 37.05 | 1.95 | 0.8 | 0.5 | 5 | 140 | 81 | | | Do. |
| G6 | 59.7 | 37.05 | 1.95 | 0.8 | 0.5 | 6 | 140 | 81 | | | Do. |

*Example 5*

Compositions were prepared and solid sheets formed therefrom following the procedure of Example 2, excepting in addition to using orthochlorostyrene, parachlorostyrene and a mixture of ortho- and parachlorostyrene were employed as the plasticizing monomers. Sheets 0.065 in. thick were formed at 150° C. The results are set forth in Table III.

bath at 150° C. Immediately after withdrawal from the hot oil the fluid contents of the flask were poured out leaving a layer of gelled plastisol about 1/16 in. thick on the inside walls of the flask. Re-immersion of the flask in the hot oil for 2 minutes resulted in polymerization of the monomer and formation of a clear, hard, tough molding on the inside of the flask. Fracture of the flask to remove the molding revealed that the outside surface of the

TABLE III

| Sample No. | Composition | | | Curing Conditions Time (min.) at 150° C. | Properties of the Cured Sheet | | | | |
|---|---|---|---|---|---|---|---|---|---|
| | PVC (wt. percent) | Monomer | Dicumyl Peroxide (wt. percent) | | Hardness (Barcol) | Flexural Strength (p.s.i.) | Bending Modulus (p.s.i.×10⁵) | Appearance | Color |
| H1 | 60 | 39.2 o-chlorostyrene | 0.8 | 1 | Soft | 2,400 | 0.74 | Opaque | White. |
| H2 | 60 | do | 0.8 | 2 | 78 | 13,140 | 4.58 | do | Do. |
| H3 | 60 | do | 0.8 | 3 | 80 | 12,730 | 5.19 | do | Do. |
| H4 | 60 | do | 0.8 | 4 | 80 | 12,730 | 4.82 | do | Do. |
| H5 | 60 | do | 0.8 | 5 | 80 | 12,730 | 5.15 | do | Do. |
| H6 | 60 | do | 0.8 | 6 | 80 | 10,960 | 4.18 | do | Do. |
| I1 | 60 | 39.2 p-chlorostyrene | 0.8 | 1 | Soft | | | Clear | Neutral. |
| I2 | 60 | do | 0.8 | 2 | Soft | | | Opaque | White. |
| I3 | 60 | do | 0.8 | 3 | 80 | 14,510 | 4.66 | do | Do. |
| I4 | 60 | do | 0.8 | 4 | 80 | 13,120 | 4.60 | do | Do. |
| I5 | 60 | do | 0.8 | 5 | 80 | 12,300 | 4.64 | do | Do. |
| I6 | 60 | do | 0.8 | 6 | 80 | 10,920 | 4.39 | do | Do. |
| J1 | 50 | 24.5 o-chlorostyrene + 24.5 p-chlorostyrene. | 1 | 1 | Soft | | | | |
| J2 | 50 | do | 1 | 2 | Soft | | | | |
| J3 | 50 | do | 1 | 3 | Soft | | | | |
| J4 | 50 | do | 1 | 4 | 80 | 9,000 | 4.2 | | |
| J5 | 50 | do | 1 | 5 | 80 | 8,700 | 4.2 | | |
| J6 | 50 | do | 1 | 6 | 80 | 9,300 | 4.4 | | |

*Example 6*

An excellent viscosity-stable dispersion of plastisol grade PVC was produced when a mixture of orthochlorostyrene, Paraplex G-50 (a high molecular weight saturated ester type PVC plasticizer) and EDMA was utilized as the plasticizing or fluidizing medium. An excellent tough clear sheet of the composition was obtained when cured for 3 minutes at 150° C. The plastisol composition was as follows:

| | Parts |
|---|---|
| PVC resin (powder) | 65 |
| Paraplex G-60 | 10 |
| Orthochlorostyrene | 23 |
| Ethylene dimethacrylate | 2 |
| Dicumyl peroxide | 0.5 |

*Example 7*

The composition described in Example 6 was slush molded in the following manner. A 100 cc. glass flask cured plastisol was an excellent reproduction of the interior surface of the flask.

*Example 8*

The fluid plastisol from Example 6 was poured over a fibrous glass mat of the type used for conventional preparation of reinforced plastics with low pressure laminating resins (e.g., unsaturated polyesters). The fluid readily wet and impregnated the mat. After curing for 2 minutes at 150° C. between stainless sheets at contact pressure, a hard transparent sheet with a flexural strength of 26,000 p.s.i. was obtained. The bending modulus of the glass reinforced sheet was 1.2×10⁶ p.s.i. The composition of the reinforced sheet was 20 percent glass mat and 80 percent of the cured plastisol.

*Example 9*

A plastisol composition of 60 percent plastisol grade PVC and 40 percent orthochlorostyrene was thermally fused in 1 minute at 140° C. in the form of a 1/10 inch thick clear flexible sheet. This sheet was then given a 2-megarad dose by passing the sheet under a 2 m.e.v. Van de Graaff accelerator at a rate of 200,000 rad/pass at room temperature. The flexible sheet was thus converted to a tough rigid solid sheet.

*Example 10*

Sheets were prepared from plastisols of 50 percent PVC and 50 percent EDMA, and of 50 percent PVC and 50 percent orthochlorostyrene in accordance with the procedure of Example 2. The sheet from the PVC-EDMA continued to burn when ignited. In contrast, the sheet from the PVC-orthochlorostyrene would not ignite in a flame even though pure monochlorostyrene burns readily.

The vinyl chloride polymer that is employed in the practice of the invention is beneficially and preferably polyvinylchloride. Or, a copolymer having at least about 85 weight percent and advantageously at least about 95 weight percent polymerized vinyl chloride in the polymer molecule with any remainder being another monoethylenically unsaturated monomer polymerized in the polymer molecule can be advantageously utilized. Ordinarily, however, it is found that increasing amounts of the comonomer decreases the stability time of the plastisol composition. Thus, copolymers of vinyl chloride with vinyl acetate, vinyl propionate, methyl acrylate, ethyl acrylate, butyl acrylate, methyl methacrylate, ethyl methacrylate, acrylonitrile, vinylidene chloride and various maleate esters typified by dibutyl maleate and the like may be employed in minor concentrations.

As indicated, it is necessary to utilize normally solid polymers and copolymers in carrying out the present invention. In this connection, polymeric material in finely divided powder or similar form which readily lends itself to mixing and blending techniques is required.

The plastifying functional monomer that is utilized in the practice of the present invention is a monochlorostyrene (wherein the chlorine is on the ring). Any of the isomers of the existing monochlorostyrenes can be utilized, e.g., metachlorostyrene, orthochlorostyrene and parachlorostyrene. Or, if desired, and which may frequently be the case, mixtures of the monchlorostyrenes can be employed as the plasticizing or dispersing medium. Advantageously, orthochlorostyrene is used for reasons that it exhibits somewhat faster reaction times.

If desired, another monoethylenically unsaturated monomer, such as a vinyl aromatic monomer can be employed along with the monochlorostyrene as the plastifying or fluidizing medium that is employed in the practice of the present invention. Exemplary of some of the vinyl aromatic monomers that may be employed with advantage are styrene, ortho-methylstyrene, para-methylstyrene, meta-ethylstyrene, para-isopropylstyrene, ortho, para-dimethylstyrene, dichloro- and difluorostyrene, trichlorostyrene, monobromostyrene, and the like.

As another aspect of the present invention, one or more different monofunctional, monoethylenically unsaturated monomers, i.e., other than a vinyl aromatic monomer, may be employed in addition to the monochlorostyrene monomer. This additional monomer should be at least compatible with the monochlorostyrene and to have a plastifying effect on the vinyl chloride polymer. These monomers can be added to provide certain functional properties to the polymer or to enhance plastification of the polymer for ease of processing and related reasons. Some of the monomers by way of example, that have been found useful in this respect are methyl acrylate, methyl methacrylate, ethyl acrylate and acrylonitrile.

Additionally, in place of or in addition to and in combination with the monochlorostyrene monomer, a polyfunctional and advantageously a difunctional plastifying monomer can be employed in the practice of the invention. Most advantageously, the polyfunctional plastifying monomeric materials that are employed in addition to the monochlorostyrene in the practice of the present invention are those which can be selected from the group consisting of divinylbenzene, the divinyl ether of diethylene glycol, ethylene glycol diacrylate, ethylene glycol dimethacrylate, glycerol, trimethacrylate, allyl methacrylate, diallyl itaconate, triallyl aconitate, triallyl cyanurate, diallyl maleate, diallyl fumarate, triallyl phosphate, vinyl methacrylate, allyl acrylate, diallyl citraconate, diisopropenyl diphenyl, the close homologues of the foregoing, and mixtures thereof. Surprisingly enough, as is apparent from the foregoing, selection of the most suitable polyfunctional plastifying monomer is relatively critical and amazingly non-predictable. Random choice of ostensibly similar or equivalent polyfunctional substances may frequently provide inexplicably dissatisfactory (or no) results. Advantageously, ethylene glycol dimethacrylate (ethylene dimethacrylate) is employed in addition to the monochlorostyrene. The polyfunctional monomer, must, of course, be capable of plastifying the vinyl chloride polymer, and be compatible with the monochlorostyrene.

Also, as has been exemplified, other materials may be employed with the monochlorostyrene that are not ethylenically unsaturated but which act as plasticizers for the vinyl chloride polymer. These include, for example, the polyester type PVC plasticizers. Such materials, as with the other monomers added to the monchlorostyrenes may be added for various reasons, to provide certain effects in the resulting product or to facilitate processing of the plastisols into shaped products.

It is also of especial advantage, although not critical to the invention, if the monomer or mixture of monomers has a relatively high boiling point, e.g., 110–125° C. or higher so that vaporization during the heat fabrication step is of no consequence.

The quantity of the monochlorostyrene (or monochlorostyrene plus other plasticizer material) that is blended with the vinyl chloride polymer to produce the viscosity-stable dispersions of the invention may not only depend on the specific nature and characteristics of the polymer that is intended to be plasticized, but also on the particular fabrication process to which the plastisol composition is to be subjected. As a general rule, it might be said that a compromising composition might be selected that provides beneficial enhancements in both the plastisol formulation prior to fabrication and the physical properties of the treated shaped product. Frequently optimum results can be achieved in both of these respects by selecting certain levels of monomer combinations. These are readily determined once the prescribed specifications are made known.

Generally, optimum toughness of the cured resin and a minimum of shrinkage during cure is achieved with the maximum amount of vinyl chloride polymer tolerated while still retaining fluidity of the plastisol dispersion. This concentration of the vinyl chloride polymer will vary with the specific polymer involved (including both polymer composition and polymer physical characteristics, i.e., particle size, porosity, etc.) but can be as high as 65–70 percent or so, based on the weight of the plastisol composition. Advantageously and beneficially, between about 35 and about 70 weight percent of the vinyl chloride polymer, based on composition weight, is employed in the plastisols of the invention.

Accordingly, between about 65 and about 30 weight percent, based on composition weight, of the monochlorostyrene (or monochlorostyrene plus other plasticizing material) is employed in the instant plastisols. In the instances when another plasticizing ethylenically unsaturated monomer or other plasticizing material is employed with the monochlorostyrene, the monochlorostyrene should constitute at least about 30 weight percent of the plastifying phase.

In some instances, it may be desirable to include a heat stabilizer in the plastisol compositions to diminish or eliminate any adverse discoloration of the product fabricated therefrom during the fusion and fabrication steps. In this regard, any of the conventional heat stabilizers for vinyl chloride polymers can be used including dibutyl tin laurate and dibutyl tin sulfide.

Other materials may be incorporated in the plastisol compositions of the invention. In this connection, when the present compositions are to be employed in certain heat fabricating processes, it may be desirable to include in the composition inhibitors that will prevent or retard to an appreciable extent homopolymerization of the monochlorostyrene during the heat fabrication of the plastisol. For example, inhibitors of the type described can be incorporated in the present plastisols when the plastisols are to be processed according to the method described in copending application Serial No. 209,838, filed July 16, 1962, now abandoned. Generally speaking, the method of copending application Serial No. 209,838 involves fabricating a vinyl chloride resin, in which the plasticizer is a polymerizable ethylenically unsaturated monomer, into a shaped article by conventional heat fabricating treatments, followed by irradiation of the shaped article, and, subsequently exposing the irradiated article to a heat treatment. In said method, it is desirable to avoid substantial homopolymerization of the plasticizer monomer during the heat fabrication step.

In the preparation of the plastisol compositions, it is important that a complete and intimate mixing be accomplished to assure uniformity in the product. Specifically, it is an essential feature that the vinyl chloride polymer be uniformly wet with the monochlorostyrene prior to the fabrication step. Any suitable mixing technique can be utilized that is suited to the purpose.

The plastisols can be fabricated by any of the conventional techniques adapted for the purpose. Thus, the plastisols of the invention can be conveniently processed into any of a number of shapes of varying sizes with the use of such techniques as slush and rotational molding, calendering, extrusion, injection and compression molding, etc. Additionally, the plastisols can be advantageously and beneficially employed for producing high strength reinforced plastics with glass mat, cloth and the like.

The curing of the plastisols concurrently with or after they have been fabricated essentially amounts to a polymerization of the monochlorostyrene therein. This polymerization may proceed principally as homopolymerization or graft copolymerization (i.e., grafting of the monochlorostyrene onto the vinyl chloride polymer "backbone") or, as a combination of the two. Conditions can be chosen to more or less control the type of polymerization when the needs of a particular product dictate that this be done. However, the exact nature or manner in which the monochlorostyrene polymerizes in the curing plastisol is not a critical feature of the present invention. It is an important feature, however, that an essentially complete cure or conversion of the monochlorostyrene to polymer be accomplished for optimum utility of and physical properties in the resulting shaped products.

Although thermal polymerization techniques can be solely resorted to for polymerizing the monochlorostyrene, beneficially, the polymerization or cure is accomplished and facilitated with the assistance of a polymerization catalyst or catalyzing influence to either propagate homopolymerization or graft polymerization or both. Thus, as before indicated, in addition to the conventional free radial generating chemical catalysts that can be utilized, a field of high energy radiation can be employed to efficiently effect a complete cure.

The chemical free radical generating catalysts which may be employed with greatest advantage in the preparation and curing of the plastisol compositions of the invention to high strength rigid products include benzoyl peroxide, cumene hydroperoxide, dicumyl peroxide, ditertiary butyl peroxide, bis tertiary butyl peroxide, $\alpha,\alpha'$-azobisisobutyronitrile and the like. Such catalysts may be used in conventional quantities to effect essentially complete polymerization of the monochlorostyrene. When they are utilized, it is, of course, of greatest benefit to incorporate them into the plastisol composition during its mixing and formulation. Ordinarily, temperatures in the range of 50° to 200° C. are advantageously employed for the polymerization or cure. A balance between the time required for the polymerization and any adverse effects of temperature on the product will usually be a factor in determining the temperature.

The high energy radiation which is employed for inducing the polymerization or curing in the practice of the present invention is of the type which provides emitted particles or photons having an intrinsic energy of a magnitude which is greater than the planetary electron binding energies that occur in the graft polymerizing materials. Such high energy radiation is conventionally available from various radioactive substances which provide beta or gamma radiation as, for example, various radioactive forms of elements, including cobalt-60 and cesium-137, nuclear reaction fission products and the like. If it is preferred, however, high energy radiation from such sources as electron beam generators, including Van de Graaff accelerators, linear accelerators, and resonant transformers; X-ray generators and the like may also be utilized. The high energy ionizing radiation of the type contemplated as being useful in practice of the present process is capable of penetrating 0.1 mm. of aluminum or similar density material. This distinguishes it from ultraviolet light, which is stopped at the surface of such a barrier. Thus, beta and gamma rays are easily capable of penetrating aluminum foil. It is beneficial to employ the high energy radiation in a field of about 50,000 rads (50 kilorads) per hour intensity. A rad, of course, is defined as 100 ergs of energy absorbed per gram of irradiated material. However, intensities down to about 1 to 10 kilorads per hour and up to about 500 kilorads per hour and higher may be advantageously employed.

Certain changes and modifications can be readily entered into in the practice of the present invention without substantially departing from its intended spirit and scope. Therefore, it is to be fully understood that the invention is not intended nor should it be construed to be limited or in any manner restricted to the delineated and preferred embodiments thereof which are contained in the foregoing description and specification. Rather, the invention should be interpreted and construed in the light of the hereto appended claims.

What is claimed is:

1. A composition of a viscosity-stable dispersion of a vinyl chloride polymer consisting essentially of an intimate mixture of
    (a) from about 35 to about 70 weight percent, based on the weight of the composition, of a polymer of a monoethylenically unsaturated monomeric material containing at least about 85 weight percent of vinyl chloride; and,
    (b) from about 65 to about 30 weight percent, based on the weight of the composition, of a monochlorostyrene.

2. The composition of claim 1, wherein said polymer of said monomeric material of (a) is polyvinyl chloride.

3. The composition of claim 1, wherein said monomeric material of (a) contains at least about 95 weight percent vinyl chloride.

4. The composition of claim 1, wherein said monochlorostyrene is orthochlorostyrene.

5. A composition of a viscosity-stable dispersion of a vinyl chloride polymer consisting essentially of
    (a) from about 35 to about 70 weight percent, based on the weight of the composition, of a polymer of a monoethylenically unsaturated monomeric material containing at least about 85 weight percent of vinyl chloride; and, (b) from about 65 to about 30 weight percent based on the weight of the composition, of a material capable of plasticizing said vinyl chloride polymer consisting of at least about 30 weight percent of a monochlorostyrene, the remainder being selected from the group consisting of di and tri ethylenically unsaturated monomeric material.

6. The composition of claim 5, wherein said polymer of said monomeric material of (a) is polyvinyl chloride.

7. The composition of claim 5, wherein said monomeric material of (a) contains at least about 95 weight percent vinyl chloride.

8. The composition of claim 5, wherein said monochlorostyrene is orthochlorostyrene.

9. The composition of claim 5, wherein said material capable of plasticizing said vinyl chloride polymer comprises a mixture of a monochlorostyrene and ethylene dimethacrylate.

10. The composition of claim 9, wherein said monochlorostyrene is orthochlorostyrene.

11. The composition of claim 9, wherein said mixture consists essentially of between about 95 and 99 weight percent of a monochlorostyrene and between about 5 and 1 weight percent ethylene dimethacrylate.

12. Method for producing solid shaped articles of vinyl chloride polymers comprising the steps of
(1) forming an intimately mixed blend consisting essentially of
    (a) from about 35 to about 70 weight percent, based on the weight of the blend, of a polymer of a monoethylenically unsaturated monomeric material containing at least about 85 weight percent of vinyl chloride; and,
    (b) from about 65 to about 30 weight percent, based on the weight of the blend, of a material containing an ethylenically unsaturated monomer capable of plasticizing said vinyl chloride polymer consisting of at least about 30 weight percent of a monochlorostyrene, the remainder being selected from the group consisting of di and tri ethylenically unsaturated monomeric material;
(2) subjecting said intimately mixed blend of (a) and (b) to a fabrication step to produce a shaped article thereof; and,
(3) polymerizing said ethylenically unsaturated monomeric mateiral capable of plasticizing said vinyl chloride polymer in said blend to form a rigid solid shaped article thereof.

13. The method of claim 12, wherein said polymer of said monomeric material of (a) is polyvinyl chloride.

14. The method of claim 12, wherein said monomeric material of (a) contains at least about 95 weight percent vinyl chloride.

15. The method of claim 12, wherein said monochlorostyrene is orthochlorostyrene.

16. The method of claim 12, wherein said ethylenically unsaturated monomeric material capable of plasticizing said vinyl chloride polymer consists of a mixture of a monochlorostyrene and ethylene dimethacrylate.

17. The method of claim 16, wherein said monochlorostyrene is orthochlorostyrene.

18. The method of claim 16, wherein said mixture consists essentially of between about 95 and 99 weight percent of a monochlorostyrene and between about 5 and 1 weight percent ethylene dimethacrylate.

19. The method of claim 12, wherein said polymerization of step (3) is catalyzed with the aid of a chemical catalyst.

20. The method of claim 12, wherein said polymerization of step (3) is catalyzed by subjecting said shaped article to a field of ionizing, penetrating high energy radiation.

21. A solid, rigid fabricated article of the composition set forth in claim 5.

References Cited by the Examiner

UNITED STATES PATENTS

| 2,746,944 | 5/1956  | Naps et al.    | 260—884 |
| 2,833,753 | 5/1958  | Lal            | 260—89.5 |
| 2,837,496 | 6/1958  | Vandenberg     | 260—884 |
| 2,912,418 | 11/1959 | Johnson et al. | 264—236 |
| 3,008,920 | 11/1961 | Urchick        | 204—154 |
| 3,012,001 | 12/1961 | Smith          | 260—884 |

OTHER REFERENCES

Schildknecht: "Vinyl and Related Polymers," John Wiley and Sons, 1952 ed., pp. 146–149 relied on.

MURRAY TILLMAN, *Primary Examiner.*

JAMES A. SEIDLECK, *Examiner.*

N. W. SHUST, J. T. GOOLKASIAN,
*Assistant Examiners.*